United States Patent
Han et al.

(10) Patent No.: US 11,189,881 B2
(45) Date of Patent: Nov. 30, 2021

(54) POUCH-SHAPED SECONDARY BATTERY COMPRISING VENTING GUIDANCE DEVICE

(71) Applicant: LG Chem, Ltd., Seoul (KR)

(72) Inventors: Hyun Gyu Han, Daejeon (KR); Dae Sik Choi, Daejeon (KR)

(73) Assignee: LG Chem, Ltd.

( * ) Notice: Subject to any disclaimer, the term of this patent is extended or adjusted under 35 U.S.C. 154(b) by 112 days.

(21) Appl. No.: 16/488,749

(22) PCT Filed: Jul. 9, 2018

(86) PCT No.: PCT/KR2018/007752
§ 371 (c)(1),
(2) Date: Aug. 26, 2019

(87) PCT Pub. No.: WO2019/045256
PCT Pub. Date: Mar. 7, 2019

(65) Prior Publication Data
US 2020/0251707 A1    Aug. 6, 2020

(30) Foreign Application Priority Data
Aug. 29, 2017 (KR) .......... 10-2017-0109716

(51) Int. Cl.
*H01M 50/342* (2021.01)
*H01M 10/04* (2006.01)
(Continued)

(52) U.S. Cl.
CPC ... *H01M 50/3425* (2021.01); *H01M 10/0436* (2013.01); *H01M 10/052* (2013.01); *H01M 50/10* (2021.01); *H01M 2220/30* (2013.01)

(58) Field of Classification Search
CPC .................................. H01M 50/342–3425
See application file for complete search history.

(56) References Cited

U.S. PATENT DOCUMENTS 8,592,063 B1    11/2013   Musetti
2006/0093895 A1    5/2006   Lim
(Continued)

FOREIGN PATENT DOCUMENTS

CN    1767230 A    5/2006
CN    201408794 Y    2/2010
(Continued)

OTHER PUBLICATIONS

Machine translation of KR 2015-0121912 A (Year: 2015).*
(Continued)

*Primary Examiner* — Robert S Carrico
(74) *Attorney, Agent, or Firm* — Lerner, David, Littenberg, Krumholz & Mentlik, LLP

(57) ABSTRACT

Disclosed herein is a pouch-shaped secondary battery comprising a pouch-shaped battery case, an electrode assembly having a positive electrode, a separator, and a negative electrode that are sequentially stacked, the electrode assembly being received in the pouch-shaped battery case, and a venting guidance device located in the pouch-shaped battery case, the venting guidance device being configured to form a through-hole for gas discharge in the pouch-shaped battery case using an elastic member, the elastic member being configured to be actuated when a pressure in the pouch-shaped battery case reaches or exceeds a predetermined limit pressure.

18 Claims, 5 Drawing Sheets

(51) Int. Cl.
*H01M 10/052* (2010.01)
*H01M 50/10* (2021.01)

(56) References Cited

U.S. PATENT DOCUMENTS

| | | | |
|---|---|---|---|
| 2011/0045324 A1* | 2/2011 | Kritzer | H01M 50/20 429/53 |
| 2012/0040215 A1 | 2/2012 | Zhu et al. | |
| 2014/0120387 A1 | 5/2014 | Kinuta et al. | |
| 2016/0036024 A1 | 2/2016 | Choi et al. | |
| 2016/0308181 A1 | 10/2016 | Kato et al. | |
| 2017/0010719 A1 | 1/2017 | Chen et al. | |
| 2017/0018748 A1 | 1/2017 | Matsuura | |
| 2017/0244082 A1 | 8/2017 | Ahn et al. | |

FOREIGN PATENT DOCUMENTS

| | | |
|---|---|---|
| CN | 103797335 A | 5/2014 |
| CN | 104253255 A | 12/2014 |
| CN | 106325579 A | 1/2017 |
| CN | 106785195 A | 5/2017 |
| EP | 2709191 A1 | 3/2014 |
| EP | 3208867 A1 | 8/2017 |
| JP | 2004342520 A | 12/2004 |
| JP | 2009224087 A | 10/2009 |
| JP | 2011044332 A | 3/2011 |
| JP | 2011233604 A | 11/2011 |
| JP | 2016031934 A | 3/2016 |
| JP | 2017068959 A | 4/2017 |
| KR | 20060037607 A | 5/2006 |
| KR | 20130063755 A | 6/2013 |
| KR | 20140053010 A | 5/2014 |
| KR | 20150121912 A | 10/2015 |
| KR | 20160014828 A | 2/2016 |
| KR | 20160021347 A | 2/2016 |
| KR | 20160086376 A | 7/2016 |
| KR | 20160147145 A | 12/2016 |
| KR | 101724618 B1 | 4/2017 |
| WO | 2013146803 A1 | 10/2013 |

OTHER PUBLICATIONS

International Search Report for PCT/KR2018/007752 dated Oct. 17, 2018.
Extended European Search Report with Written Opinion for Application No. 18849974.3 dated Mar. 24, 2020, 8 pages.
Search Report from Office Action for Chinese Application No. 201880006170.7 dated Jul. 15, 2021; 4 pages.

* cited by examiner

[FIG. 1]
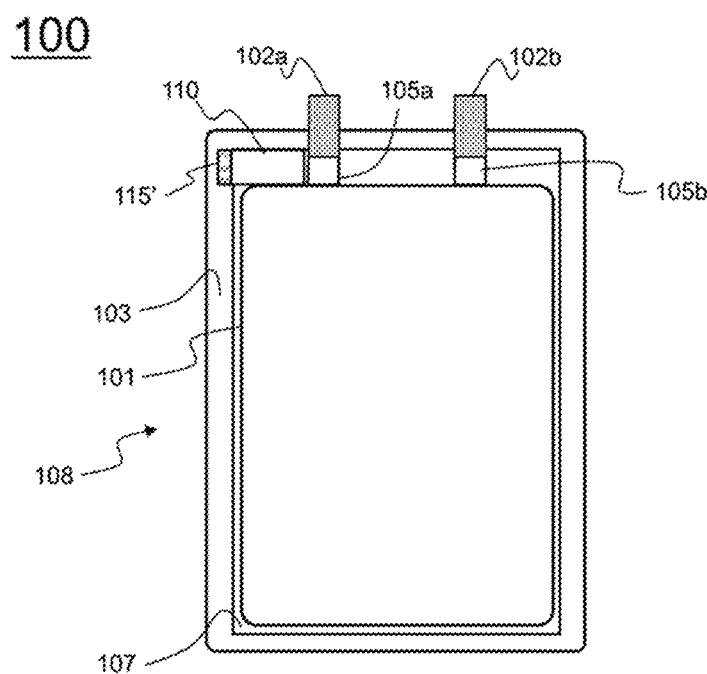

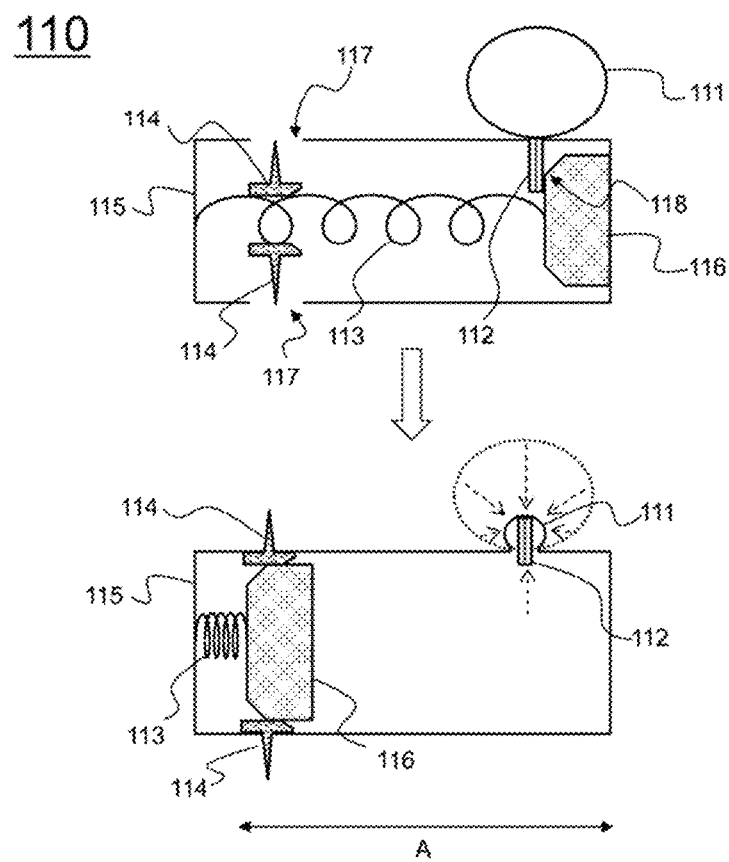
[FIG. 2]

【FIG. 3】
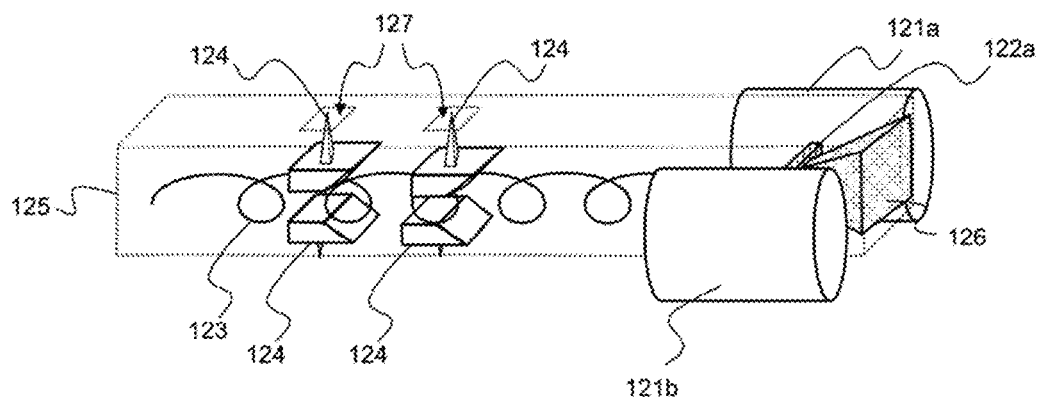
【FIG. 4】
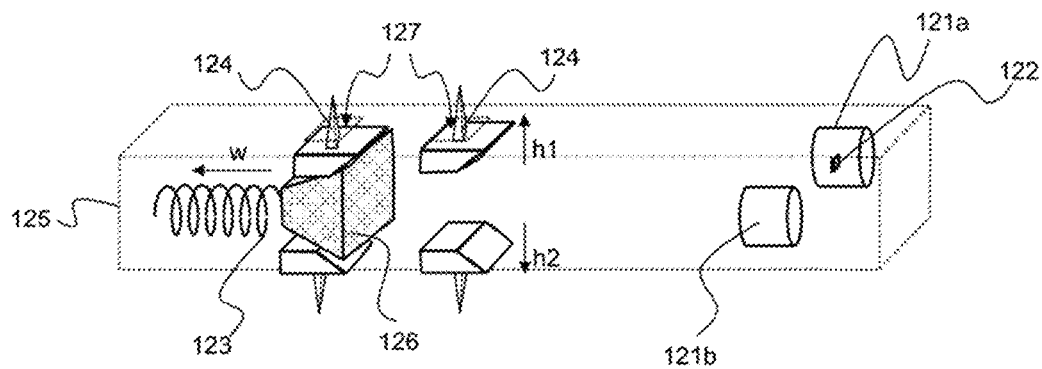

[FIG. 5]
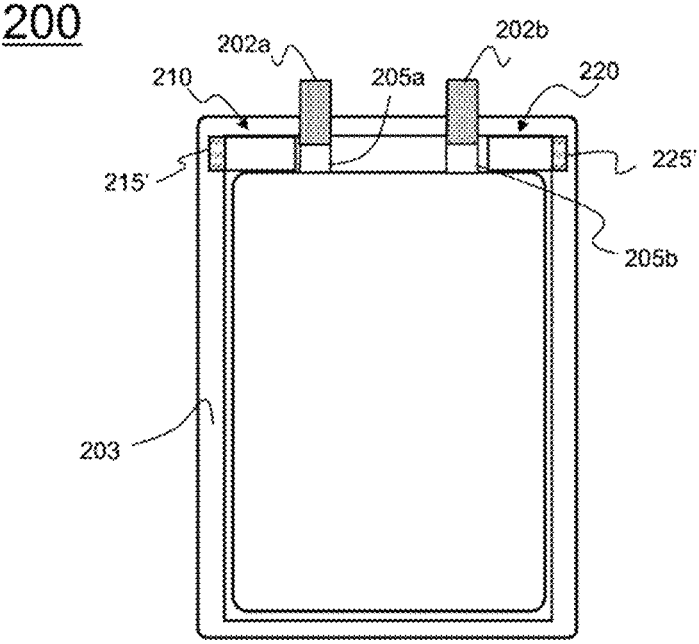

[FIG. 6]
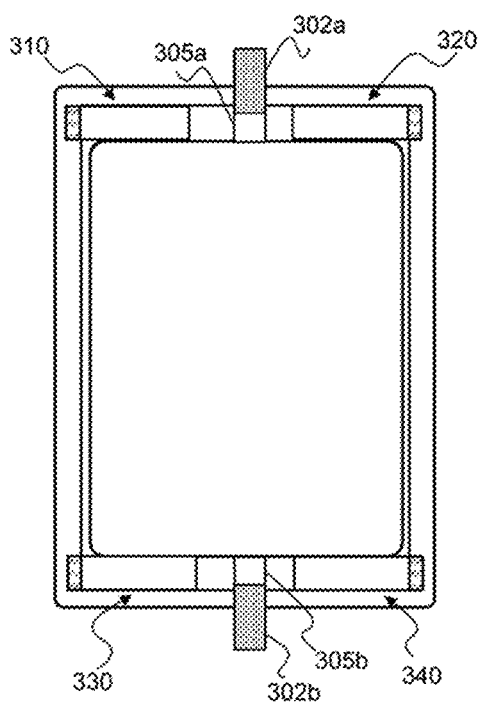

POUCH-SHAPED SECONDARY BATTERY COMPRISING VENTING GUIDANCE DEVICE

CROSS-REFERENCE TO RELATED APPLICATIONS

This application is a national phase entry under 35 U.S.C. § 371 of International Patent Application No. PCT/KR2018/007752, filed on Jul. 9, 2018, published in Korean, which claims priority to Korean Patent Application No. 10-2017-0109716, filed on Aug. 29, 2017, the disclosures of which are hereby incorporated by reference herein in their entireties.

TECHNICAL FIELD

The present invention relates to a pouch-shaped secondary battery including a venting guidance device, and more particularly to a pouch-shaped secondary battery including a venting guidance device located in a pouch-shaped battery case, the venting guidance device being configured to form a through-hole for gas discharge in the pouch-shaped battery case using an elastic member that is triggered.

BACKGROUND ART

As mobile devices have been continuously developed and the demand for such mobile devices has increased, the demand for secondary batteries as an energy source for such mobile devices has also sharply increased. Accordingly, much research into batteries satisfying various needs has been carried out.

Lithium secondary batteries may be classified into a cylindrical battery, a prismatic battery, and a pouch-shaped battery based on the shape of a battery case. The cylindrical battery is a battery that is configured to have a structure in which an electrode assembly is mounted in a metal can. The prismatic battery is also a battery that is configured to have a structure in which an electrode assembly is mounted in a metal can. The pouch-shaped battery is a battery that is configured to have a structure in which an electrode assembly is generally mounted in a pouch-shaped battery case made of an aluminum laminate sheet. Among these battery cells, the pouch-shaped battery cell, which can be stacked with high integration, has high energy density per unit weight, is inexpensive, and can be easily modified, has attracted considerable attention.

One of the principal research projects for pouch-shaped batteries, each of which has a soft sheathing member, is to improve the safety of the pouch-shaped batteries. A lithium secondary battery, which includes an electrode assembly, may explode due to high temperature and pressure in the secondary battery, which may be caused by an abnormal state of the secondary battery, such as a short circuit in the secondary battery, overcharge of the secondary battery with higher than an allowed current or voltage, exposure of the secondary battery to high temperature, or deformation of the secondary battery due to being dropped or having an external impact applied thereto.

As an example of attempts for preventing the explosion of the battery and thus guaranteeing the safety of the battery, Korean Patent Application Publication No. 2015-0121912 discloses a pouch penetration device for forming a hole in a pouch using an elastic member that is configured to shrink when the pressure in a battery cell increases.

According to the above-described technology, when a plate moves upwards due to gas generated in a secondary battery, a penetration member also moves upwards and thus penetrates a sheathing member of the pouch penetration device and the pouch of the secondary battery in order to discharge the gas. The plate moves upwards to shrink the elastic member due to the pressure of the gas in the secondary battery. The direction in which the plate moves and the direction in which the elastic member is restored due to the elastic force thereof are opposite each other. In order for the penetration member to penetrate the pouch of the secondary battery, therefore, a great increase in pressure is needed. For this reason, a through-hole may not be formed at a desired pressure, with the result that the gas may not be sufficiently discharged from the secondary battery.

Korean Patent Application Publication No. 2016-0147145 discloses a secondary battery including a rupturing means disposed on an electrode lead for perforating a pouch in order to discharge gas to the outside when the pouch swells.

The above-described technology is applicable only to a secondary battery configured such that a receiving hole for receiving the rupturing means is formed in an electrode lead. Consequently, the technology is not applicable to a secondary battery including a general electrode lead.

Japanese Patent Application Publication No. 2011-044332 discloses a laminate-sheathed electric storage device configured such that a plate configured to perforate a sheathing film is located at a non-joint region of a sealed portion of a pouch-shaped battery cell.

The above-described technology requires a process of disposing a heat block in order to form, in particular, the non-joint region at the time of forming the sealed portion and removing the heat block. For this reason, it is difficult to apply the technology to a process of manufacturing a general pouch-shaped battery.

Japanese Patent Application Publication No. 2011-233604 discloses an inner pressure release device attached to the outer surface of a pouch to open an opening in the pouch when the pouch swells. Since the inner pressure release device is fixed to the outside of the pouch, however, it is difficult to adjust the extent of swelling necessary in order for the inner pressure release device to penetrate the pouch, whereby it is difficult to guide the discharge of gas from the pouch under desired conditions.

Therefore, there is a strong necessity for technology that is capable of preventing the explosion of a pouch-shaped secondary battery due to the generation of gas in the secondary battery, is capable of being applied to a general pouch-shaped secondary battery, and is capable of preventing an increase in the overall volume of the secondary battery and thus preventing a reduction in the capacity of the secondary battery.

DISCLOSURE

Technical Problem

The present invention has been made in view of the above problems, and it is an object of the present invention to provide a secondary battery including a venting guidance device located in a pouch-shaped battery case, the venting guidance device being configured to form a through-hole in the pouch-shaped battery case using an elastic member that is operated when the pressure in the pouch-shaped battery case increases.

In addition, the venting guidance device is located in a pouch-shaped secondary battery. Consequently, it is possible to provide a pouch-shaped secondary battery configured such that the overall size of the secondary battery is not increased and such that a decrease in the capacity of the secondary battery is prevented.

Technical Solution

In accordance with an aspect of the present invention, the above and other objects can be accomplished by the provision of a pouch-shaped secondary battery comprising a pouch-shaped battery case, an electrode assembly having a positive electrode, a separator, and a negative electrode that are sequentially stacked, the electrode assembly being received in the pouch-shaped battery case, and a venting guidance device located in the pouch-shaped battery case, the venting guidance device being configured to form a through-hole for gas discharge in the pouch-shaped battery case using an elastic member, the elastic member being configured to be actuated when a pressure in the pouch-shaped battery case reaches or exceeds a predetermined limit pressure.

The pouch-shaped secondary battery according to the present invention is configured to have a structure in which the venting guidance device is located in the pouch-shaped battery case. Specifically, the venting guidance device is located in the dead space defined in the pouch-shaped battery case, which is needlessly wasted, whereby it is possible to prevent an increase in the overall size of the pouch-shaped battery case.

In addition, the venting guidance device includes an elastic member that is triggered when the pressure in the pouch-shaped battery case increases due to gas generated in the pouch-shaped battery case. Consequently, it is possible to rapidly form a through-hole for gas discharge in the pouch-shaped battery case before the pouch-shaped battery case explodes due to swelling thereof, whereby it is possible to provide a secondary battery having improved safety.

In addition, the venting guidance device may be received in a space defined in a general pouch-shaped secondary battery. Consequently, no additional device for applying the venting guidance device according to the present invention to the secondary battery is needed. Furthermore, it is possible to obviate selective application only to a specific-shaped member.

In a concrete example, the venting guidance device may include a pressure-sensing member configured to shrink when a volume of the pouch-shaped battery case reaches or exceeds a predetermined limit volume, a trigger coupled to the pressure-sensing member, the trigger being configured to move into the pressure-sensing member when the pressure-sensing member shrinks, the trigger in an initial position fixing the elastic member in a stretched state, a penetration member configured to penetrate the pouch-shaped battery case to form the through-hole in the pouch-shaped battery case when the elastic member moves from the stretched state to a compressed state, and a venting guidance case in which the elastic member is disposed, the venting guidance case defining a trigger movement path and a penetration member movement path therein.

That is, the pressure-sensing member is made of a material that can shrink and expand depending on the difference between the pressure inside the pressure-sensing member and the pressure outside the pressure-sensing member. On the assumption that the state in which there is no difference between the pressure inside the pressure-sensing member and the pressure outside the pressure-sensing member is a normal state, the pressure-sensing member may be configured to shrink when the pressure outside the pressure-sensing member is higher than the pressure inside the pressure-sensing member and to expand when the pressure outside the pressure-sensing member is lower than the pressure inside the pressure-sensing member.

In the case in which the pressure in the pouch-shaped battery cell increases due to gas generated in the battery cell, therefore, the pressure outside the pressure-sensing member becomes higher than the pressure inside the pressure-sensing member, whereby the pressure-sensing member shrinks. At this time, the trigger, which communicates with the pressure-sensing member, moves into the pressure-sensing member. As a result, the fixed state of the elastic member is released by the movement of the trigger.

As described above, the elastic member is configured to move from the stretched state to the compressed state due to an elastic bias thereof when the trigger is uncoupled from the elastic member, whereby the elastic member is restored to the original state thereof. In response to the movement of the elastic member, the penetration member moves toward the pouch-shaped battery case.

The penetration member may be configured to move in a direction perpendicular to the plane of the pouch-shaped battery case to form the through-hole in the pouch-shaped battery case when the elastic member moves from the stretched state to the compressed state.

Specifically, a tapered member, which is configured such that the vertical section of the tapered member is gradually decreased toward the elastic member, is connected to one end of the elastic member in the direction opposite the direction in which the elastic member is fixed to the case. When the elastic member moves from the stretched state to the compressed state, the tapered member may push the penetration member toward the pouch-shaped battery case.

The material for the elastic member is not particularly restricted, as long as the elastic member can shrink in the state of being stretched due to the operation of the trigger. In a concrete example, the elastic member may be a spring or a piece of rubber.

The case may have a cuboidal or cylindrical structure. In the case in which the case has a cuboidal structure, the case may preferably be a rectangular parallelepiped, and the trigger and the pressure-sensing member may be attached to at least one of the four surfaces of the case in the major-axis direction. In the case in which the case has a cylindrical structure, one or more triggers and pressure-sensing members may be attached to the cylindrical surface of the case.

In consideration of the fact that the linear elastic member is received in the case, the venting guidance device may have a structure including a major axis, which is relatively long, and a minor axis, which is relatively short, when viewed in a plan view. The location of the venting guidance device having the above structure in the pouch-shaped battery case may be set in consideration of an increase in the volume of the secondary battery.

In the case in which the venting guidance device is located at the side surface of the electrode assembly that is adjacent to the direction in which the electrode terminal of the electrode assembly protrudes, the overall size of the battery cell is increased, which is undesirable.

Preferably, therefore, the venting guidance device is received in the pouch-shaped battery case such that the major-axis direction of the venting guidance case is parallel to the side surface of the electrode assembly from which the electrode terminal protrudes.

Generally, in the case of an electrode assembly configured to have a structure in which a plurality of electrode tabs is connected to a single electrode lead, like a stacked-type electrode assembly, the connection between the electrode tabs and the electrode lead occupies a predetermined volume in the battery case while constituting a V form. The remaining portion of the battery case, which is not occupied by the electrode tabs and the electrode lead, is empty. In order to achieve easy installation of the venting guidance device and to prevent an increase in the volume of the secondary battery and a decrease in the capacity of the secondary battery, therefore, it is further preferable for the venting guidance device to be located adjacent to a location at which the electrode tabs and the electrode lead are affixed to one another in the pouch-shaped battery case.

In the case in which the venting guidance device is not fixed in the secondary battery, the location of the penetration member may be changed, with the result that no opening for gas discharge may be formed even when the elastic member is triggered. In a concrete example, the venting guidance case, which constitutes the venting guidance device, may be fixed to a sealed portion of the pouch-shaped battery case. Specifically, at the step of sealing the pouch-shaped secondary battery, sealing may be performed in the state in which a portion of the venting guidance device is located at a portion to be sealed.

In consideration of the fact that the pressure limit of the pouch-shaped battery case, at which the pouch-shaped battery case explodes due to swelling thereof, is generally about 3 bar, it is preferable to form the opening for gas discharge within a range of pressure less than the above-mentioned pressure. Consequently, the range of the inner pressure of the pouch-shaped battery case at which the pressure sensor member shrinks to trigger the elastic member may range from 2 bar to less than 3 bar.

In order to form the opening for gas discharge when the pressure in the pouch-shaped battery case increases, the trigger must move into the pressure-sensing member. To this end, the pressure-sensing member must shrink. Consequently, it is preferable for the pressure in the pressure-sensing member to be lower than the pressure in the pouch-shaped battery case in the swollen state.

In a concrete example, a single venting guidance device may include two or more penetration members in consideration of the fact that it is necessary to achieve rapid gas discharge in the case in which the battery case swells due to abnormal operation of the pouch-shaped secondary battery, and at least two penetration member movement paths may be formed in the case.

In addition, a single pouch-shaped secondary battery may include two or more venting guidance devices. Specifically, in the structure in which a positive electrode terminal and a negative electrode terminal protrude in opposite directions, the venting guidance devices may be located at opposite sides of the positive electrode terminal, may be located at opposite sides of the negative electrode terminal, or may be located at opposite sides of the positive electrode terminal and opposite sides of the negative electrode terminal.

In accordance with another aspect of the present invention, there is provided a battery pack including the pouch-shaped secondary battery.

Specifically, the battery pack may be used as a power source for a device requiring the ability to withstand high temperatures, a long cycle, high rate characteristics, etc. Specific examples of the device may include a mobile electronic device, a wearable electronic device, a power tool driven by a battery-powered motor, an electric automobile, such as an electric vehicle (EV), a hybrid electric vehicle (HEV), or a plug-in hybrid electric vehicle (PHEV), an electric two-wheeled vehicle, such as an electric bicycle (E-bike) or an electric scooter (E-scooter), an electric golf cart, and a power storage system. However, the present invention is not limited thereto.

The structure and manufacturing method of the device are well known in the art to which the present invention pertains, and a detailed description thereof will be omitted.

BRIEF DESCRIPTION OF DRAWINGS

FIG. 1 is a plan view showing a pouch-shaped secondary battery including a venting guidance device according to an embodiment of the present invention.

FIG. 2 is a front view showing the operation of the venting guidance device of FIG. 1.

FIG. 3 is a perspective view showing a venting guidance device according to another embodiment of the present invention before being operated.

FIG. 4 is a perspective view showing the venting guidance device of FIG. 3 after being operated.

FIG. 5 is a plan view showing a pouch-shaped secondary battery including a venting guidance device according to another embodiment of the present invention.

FIG. 6 is a plan view showing a pouch-shaped secondary battery including a venting guidance device according to a further embodiment of the present invention.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

Wherever possible, the same reference numbers will be used throughout the drawings to refer to parts that perform similar functions or operations. Meanwhile, in the case in which one part is 'connected' to another part in the following description of the present invention, not only may the one part be directly connected to the another part, but also, the one part may be indirectly connected to the another part via a further part. In addition, that a certain element is 'included' means that other elements are not excluded, but may be further included unless mentioned otherwise.

FIG. 1 is a plan view showing a pouch-shaped secondary battery including a venting guidance device according to an embodiment of the present invention, and FIG. 2 is an enlarged front view showing the venting guidance device of FIG. 1.

Referring to FIGS. 1 and 2, a pouch-shaped secondary battery 100, an outer edge 103 of which is sealed, includes an upper case (not shown) and a lower case 108. The pouch-shaped secondary battery 100 is provided in the middle part thereof with an electrode assembly reception unit 107, which is configured to have a concave structure in which an electrode assembly 101 is received. The electrode assembly 101 is configured to have a structure in which positive electrode tabs 105a and negative electrode tabs 105b protrude in the same direction. A positive electrode lead 102a is connected to the outer ends of the positive electrode tabs 105a, and a negative electrode lead 102b is connected to the outer ends of the negative electrode tabs 105*b*. The positive electrode lead 102*a* and the negative electrode lead 102*b* extend out of the battery case.

The positive electrode tabs and the negative electrode tabs may protrude in the same direction or in different directions.

Since the electrode tabs 105*a* and 105*b* and the electrode leads are bent at the connections between the electrode tabs and the electrode leads in the direction in which the electrode tabs protrude, the electrode assembly and the battery case face each other in the state of being spaced apart from each other by a distance corresponding to the length of each of the connections between the electrode tabs and the electrode leads.

A venting guidance device 110 is disposed in the portion of the space defined between the electrode assembly and the battery case in which the electrode tabs and the electrode leads are not located.

The venting guidance device 110 includes a pressure-sensing member 111 configured to shrink in response to an increase in the volume of a pouch-shaped battery case, a trigger 112 communicating with the pressure-sensing member 111, the trigger 112 being configured to move into the pressure-sensing member 111 when the pressure-sensing member shrinks, an elastic member 113 fixed by the trigger in the state of being stretched, penetration members 114 configured to penetrate the pouch-shaped battery case in order to form openings when the elastic member shrinks, and a case 115 for receiving the elastic member 113, the case being provided with a trigger movement path 118 and penetration member movement paths 117.

One end of the elastic member 113 is connected and fixed to one surface of the case 115 in the state in which the elastic member is stretched, and the other end of the elastic member 113 is connected to a tapered member 116.

The pressure-sensing member 111 is located on the outer surface of the case 115, and the trigger 112, which is connected to the pressure-sensing member 111, extends into the case 115 through the trigger movement path 118 in the case. The trigger 112 fixes the elastic member 113 in the state in which the elastic member is stretched. The trigger is located at the connection between the tapered member 116, which is connected to the other end of the elastic member 113, and the elastic member 113 in order to fix the tapered member 116 such that the tapered member cannot move.

When the pressure outside the pressure-sensing member 111 becomes higher than the pressure inside the pressure-sensing member 111 due to swelling of the battery case, the pressure-sensing member 111 shrinks, with the result that the trigger 112, which is attached to the pressure-sensing member 111, moves toward the pressure-sensing member 111.

As the result of the movement of the trigger 112, the fixed state of the tapered member 116 is released, and therefore the elastic member 113 shrinks. At this time, the tapered member 116 also moves in the direction in which the elastic member 113 shrinks. Since the tapered member 116 moves while the inclined surface of the tapered member 116 pushes the inclined surfaces of the penetration members 114 toward the outside of the case 115, the penetration members 114 move toward the outside of the case in the direction perpendicular to the direction in which the elastic member shrinks while passing through the penetration member movement paths 117.

Consequently, the penetration members 114 penetrate the pouch-shaped battery case (not shown) in the direction perpendicular to the plane of the pouch-shaped battery case in order to form openings for gas discharge.

The case 115 is mounted in the battery case such that the side surface of the case 115 in the major-axis direction A is opposite the side surface of the electrode assembly in the direction in which the electrode tabs protrude. A portion 115' of the case 115, which overlaps a sealed portion of the outer edge of the battery case, is located on the sealed portion, and is fixed by thermal fusion when the battery case in sealed.

The venting guidance device 110 is configured such that the penetration members 114 and the pressure-sensing member 111 are located in the same plane. In the state in which the pressure-sensing member 111 swells, the penetration members 114 do not contact the battery case. When the pressure-sensing member 111 shrinks, the penetration members 114 move to the outside of the case 115 in order to form through-holes in the battery case.

The penetration members 114 may be located adjacent to the outer edge of the battery case. Since the outer edge of the battery case swells slightly, it is possible to easily form the through-holes even when the battery case swells.

FIGS. 3 and 4 are perspective views schematically showing the process in which openings are formed through the pouch-shaped battery case using a venting guidance device 120.

Referring to FIGS. 3 and 4, the venting guidance device 120 is different from the venting guidance device 110 in that two penetration members 124 are located at each of the upper surface and the lower surface of a case 125 and in that two pairs of pressure-sensing members 121*a* and 121*b* and triggers 122*a* are included. The other elements of the venting guidance device 120 and the principle by which the venting guidance device 120 is operated are identical to the other elements of the venting guidance device 110 and the principle by which the venting guidance device 110 is operated. Meanwhile, the venting guidance device 120 is different from the venting guidance device 110 in that the two pressure-sensing members 121*a* and 121*b* are located in a plane different from the plane in which the penetration members 124 are located.

The venting guidance device 120 includes an elastic member 123, one end of which is fixed to the case 125, a tapered member 126, which is fixed to the other end of the elastic member 123, triggers 122*a* for fixing the tapered member 126 at the connection between the tapered member 126 and the elastic member 123, the triggers 122*a* being connected to pressure-sensing members 121*a* and 121*b*, and penetration members 124.

Although only one of the triggers 122*a* is shown, the other trigger is attached to the pressure-sensing member 121*b*.

When the pressure in the pouch-shaped battery case increases, the pressure-sensing members 121*a* and 121*b* shrink, and the triggers, which are connected to the pressure-sensing members, move into the respective pressure-sensing members. As a result, the fixed state of the tapered member 126 is released. Consequently, the tapered member 126 moves in the direction w in which the elastic member 123, which is stretched, shrinks. At this time, the tapered member 126 pushes the penetration members 124 to the outside of the case 125. The pointed portions of the penetration members 124 move in the directions h1 and h2 perpendicular to the pouch-shaped battery case (not shown) while passing through penetration member movement paths 127 in order to form openings for gas discharge in the pouch-shaped battery case.

Since the venting guidance device 120 includes four penetration members 124, four openings may be formed in the pouch-shaped battery case, whereby gas may be rapidly discharged from the battery case.

In addition, since the venting guidance device 120 includes two pairs of pressure-sensing members and triggers, the response of the venting guidance device is very reliable.

In the venting guidance device 120, the directions in which the penetration members 124 move and the locations of the pressure-sensing members 121a and 121b are different from each other. The penetration members 124 are located so as to face the battery case, and the pressure-sensing members 121a and 121b are located in the electrode assembly reception unit between the electrode assembly and the battery case.

FIG. 5 is a plan view schematically showing a pouch-shaped secondary battery according to another embodiment of the present invention.

Referring to FIG. 5, a pouch-shaped secondary battery 200 according to another embodiment of the present invention is configured such that a venting guidance device 210 is located at the left side of the connection between a positive electrode tab 205a and a positive electrode lead 202a, such that a venting guidance device 220 is located at the right side of the connection between a negative electrode tab 205b and a negative electrode lead 202b, and such that the left end 215' of the venting guidance device 210 and the right end 225' of the venting guidance device 220 are fixed to a battery case while being located so as to overlap a sealed portion of an outer edge 203 of the battery case.

FIG. 6 is a plan view schematically showing a pouch-shaped secondary battery according to a further embodiment of the present invention.

Referring to FIG. 6, a pouch-shaped secondary battery 300 is configured to have a structure in which a positive electrode tab 305a and a positive electrode lead 302a protrude upwards when viewed in a plan view and in which a negative electrode tab 305b and a negative electrode lead 302b protrude downwards when viewed in a plan view.

A venting guidance device 310 and a venting guidance device 320 are located respectively at opposite sides of the connection between the positive electrode tab 305a and the positive electrode lead 302a, and a venting guidance device 330 and a venting guidance device 340 are located respectively at opposite sides of the connection between the negative electrode tab 305b and the negative electrode lead 302b.

In the case in which the four venting guidance devices 310, 320, 330, and 340 are included, as described above, at least four through-holes are formed. Consequently, it is possible to rapidly discharge gas, whereby it is possible to prevent the secondary battery from exploding.

The structure of each of the venting guidance devices 210, 220, 310, 320, 330, and 340 is similar to that of the venting guidance device 110, and therefore a detailed description thereof will be omitted.

As is apparent from the above description, the pouch-shaped secondary battery according to the present invention is configured such that the venting guidance device is received in the reception unit of the battery case. As a result, it is possible to utilize the dead space in the secondary battery without increasing the volume of the secondary battery. In addition, it is possible to rapidly form openings for gas discharge in the pouch-shaped battery case when the volume of the battery case increases, whereby it is possible to prevent explosion of the secondary battery due to an increase in the inner pressure of the secondary battery. Consequently, it is possible to provide a secondary battery having improved safety.

Those skilled in the art to which the present invention pertains will appreciate that various applications and modifications are possible based on the above description, without departing from the scope of the present invention.

DESCRIPTION OF REFERENCE NUMERALS 100, 200, 300: Pouch-shaped secondary batteries
101: Electrode assembly
102a, 202a, 302a: Positive electrode leads
105a, 205a, 305a: Positive electrode tabs
102b, 202b, 302b: Negative electrode leads
105b, 205b, 305b: Negative electrode tabs
103, 203: Outer edges
107: Reception unit
108: Lower case
110, 210, 220, 310, 320, 330, 340: Venting guidance devices
111, 121a, 121b: Pressure-sensing members
112, 122a: Triggers
113, 123: Elastic members
114, 124: Penetration members
115, 125: Cases of venting guidance devices
115', 215', 225': Portions of cases of venting guidance devices that overlap sealed portions of battery cases
116, 126: Tapered members
117, 127: Penetration member movement paths
118: Trigger movement path
A: Major-axis direction of case of venting guidance device
h1, h2: Direction perpendicular to plane of pouch-shaped battery case
w: Direction in which elastic member shrinks

INDUSTRIAL APPLICABILITY

As is apparent from the above description, the pouch-shaped secondary battery according to the present invention includes a venting guidance device for forming through-holes for gas discharge in a pouch-shaped battery case using an elastic member that is triggered when the pressure in a battery cell increases. Consequently, it is possible to rapidly and accurately form openings for gas discharge when the volume of the battery case increases without increasing the overall size of the pouch-shaped secondary battery.

In addition, since the venting guidance device is received in the space defined in the pouch-shaped secondary battery, no additional device for applying the venting guidance device according to the present invention is required, and the venting guidance device is widely applicable to pouch-shaped secondary batteries having various sizes.

In addition, the size of the trigger, the magnitude of the pressure in the pressure-sensing member, and the shape of the penetration member may be selectively applied in order to adjust the pressure in the pouch-shaped battery case such that openings are formed in the pouch-shaped battery case.

The invention claimed is:

1. A pouch-shaped secondary battery, comprising:
a pouch-shaped battery case;
an electrode assembly having a positive electrode, a separator, and a negative electrode that are sequentially stacked, the electrode assembly being received in the pouch-shaped battery case; and
a venting guidance device located in the pouch-shaped battery case, the venting guidance device being configured to form a through-hole for gas discharge in the pouch-shaped battery case using an elastic member, the elastic member being configured to be actuated when a pressure in the pouch-shaped battery case reaches or exceeds a predetermined limit pressure, wherein the venting guidance device comprises:

a pressure-sensing member configured to shrink when a volume of the pouch-shaped battery case reaches or exceeds a predetermined limit volume;

a trigger coupled to the pressure-sensing member, the trigger being configured to move into the pressure-sensing member when the pressure-sensing member shrinks, the trigger in an initial position fixing the elastic member in a stretched state;

a penetration member configured to penetrate the pouch-shaped battery case to form the through-hole in the pouch-shaped battery case when the elastic member moves from the stretched state to a compressed state; and a venting guidance case in which the elastic member is disposed, the venting guidance case defining a trigger movement path and a penetration member movement path therein.

2. The pouch-shaped secondary battery according to claim 1, wherein the elastic member is configured to move from the stretched state to the compressed state due to an elastic bias thereof when the trigger is uncoupled from the elastic member.

3. The pouch-shaped secondary battery according to claim 1, wherein the penetration member is configured to move in a direction perpendicular to a plane of the pouch-shaped battery case to form the through-hole when the elastic member moves from the stretched state to the compressed state.

4. The pouch-shaped secondary battery according to claim 3, further comprising a tapered member that is connected to one end of the elastic member, the tapered member being configured to push the penetration member toward the pouch-shaped battery case when the elastic member moves from the stretched state to the compressed state.

5. The pouch-shaped secondary battery according to claim 1, wherein the elastic member is a spring or a piece of rubber.

6. The pouch-shaped secondary battery according to claim 1, wherein the venting guidance device is configured such that a major-axis direction of the venting guidance case is parallel to a side surface of the electrode assembly from which an electrode terminal protrudes.

7. The pouch-shaped secondary battery according to claim 1, wherein the venting guidance device is located adjacent to a location at which an electrode tab and an electrode lead are affixed to one another in the pouch-shaped battery case.

8. The pouch-shaped secondary battery according to claim 1, wherein the venting guidance case is fixed to a sealed portion of the pouch-shaped battery case.

9. The pouch-shaped secondary battery according to claim 1, wherein the pressure-sensing member is configured to move from a swollen state to a compressed state, and a pressure in the pressure-sensing member is lower than the pressure in the pouch-shaped battery case when the pressure-sensing member is in the swollen state.

10. The pouch-shaped secondary battery according to claim 1, wherein the penetration member movement path is a first penetration member movement path, and at least two penetration member movement paths including the first penetration member movement path are defined within the venting guidance case.

11. The pouch-shaped secondary battery according to claim 1, wherein the venting guidance device is a first venting guidance device, and the pouch-shaped secondary battery comprises two or more venting guidance devices including the first venting guidance device.

12. A battery pack comprising a pouch-shaped secondary battery according to claim 1.

13. A method of venting a pouch-shaped secondary battery, the method comprising:

providing a pouch-shaped battery case including an electrode assembly having a positive electrode, a separator, and a negative electrode that are sequentially stacked, the electrode assembly being received in the pouch-shaped battery case, the pouch-shaped battery case further including a venting guidance device located in the pouch-shaped battery case and having an elastic member disposed in an initial stretched state, the venting guidance device including a pressure-sensing member, a trigger coupled to the pressure-sensing member, a penetration member, and a venting guidance case in which the elastic member is disposed;

increasing at least one of a volume or a pressure inside the pouch-shaped battery case;

shrinking the pressure-sensing member due to the increasing of the pressure inside the pouch-shaped battery case;

moving the trigger into the pressure-sensing member along a trigger movement path within the venting guidance case, the moving of the trigger caused by the shrinking of the pressure-sensing member;

moving the elastic member from the initial stretched state to a compressed state, the moving of the elastic member causing the venting guidance device to form a through-hole in the pouch-shaped battery case;

actuating the penetration member to form the through-hole in the pouch-shaped battery case, the actuating of the penetration member caused by the elastic member moving from the initial stretched state to the compressed state, the actuating of the penetration member including moving the penetration member within the venting guidance case; and discharging gas from inside the pouch-shaped battery case out of the through-hole.

14. The method according to claim 13, wherein the elastic member moves from the initial stretched state to the compressed state due to an elastic bias thereof when the trigger is uncoupled from the elastic member.

15. The method according to claim 13, wherein the penetration member moves in a direction perpendicular to a plane of the pouch-shaped battery case to form the through-hole when the elastic member moves from the initial stretched state to the compressed state.

16. The method according to claim 13, wherein the venting guidance case further includes a tapered member that is connected to one end of the elastic member, and the tapered member pushes the penetration member toward the pouch-shaped battery case when the elastic member moves from the initial stretched state to the compressed state.

17. The method according to claim 13, wherein the pressure-sensing member moves from a swollen state to a compressed state due to the increasing of the pressure inside the pouch-shaped battery case, and a pressure in the pressure-sensing member is lower than the pressure in the pouch-shaped battery case when the pressure-sensing member is in the swollen state.

18. The method according to claim 13, wherein the penetration member is a first penetration member and the through-hole is a first through-hole, the method further comprising actuating the second penetration member to from a second through-hole in the pouch-shaped battery case, the actuating of the second penetration member caused by the elastic member moving from the initial stretched state to the compressed state, the actuating of the second penetration member including moving the second penetration member within the venting guidance case.

* * * * *